US011117593B2

(12) United States Patent
Kondo et al.

(10) Patent No.: US 11,117,593 B2
(45) Date of Patent: Sep. 14, 2021

(54) INFORMATION SYSTEM, DRIVING ASSISTANCE INFORMATION PROVIDING METHOD, AND IN-VEHICLE TERMINAL

(71) Applicant: Clarion Co., Ltd., Saitama (JP)

(72) Inventors: Akihiro Kondo, Tokyo (JP); Keita Shimada, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 297 days.

(21) Appl. No.: 16/117,726

(22) Filed: Aug. 30, 2018

(65) Prior Publication Data

US 2019/0077413 A1  Mar. 14, 2019

(30) Foreign Application Priority Data

Sep. 12, 2017 (JP) .............................. JP2017-175071

(51) Int. Cl.
*B60W 50/08* (2020.01)
*B60W 50/00* (2006.01)
(Continued)

(52) U.S. Cl.
CPC ............ *B60W 50/08* (2013.01); *B60W 50/00* (2013.01); *B60W 50/0098* (2013.01);
(Continued)

(58) Field of Classification Search
CPC .. B60W 50/08; B60W 50/0098; B60W 50/00; B60W 2540/30; B60W 2050/0089;
(Continued)

(56) References Cited

U.S. PATENT DOCUMENTS 10,054,457 B2 * 8/2018 Takahara ........... G01C 21/3484
2012/0191343 A1 * 7/2012 Haleem .............. G01C 21/3461
701/431
(Continued)

FOREIGN PATENT DOCUMENTS

EP    1 830 161 A1   9/2007
JP   2005-106475 A   4/2005
(Continued)

OTHER PUBLICATIONS

Extended European Search Report issued in counterpart European Application No. 18191369.0 dated Jan. 23, 2019 (nine pages).
(Continued)

*Primary Examiner* — Todd Melton
(74) *Attorney, Agent, or Firm* — Crowell & Moring LLP

(57) ABSTRACT

An information system includes an in-vehicle terminal that is mounted on a host vehicle and a server that communicates with the in-vehicle terminal. The server includes a running history DB in which a running history of the host vehicle is stored for each driver, a driving skill-level determination unit, a driving skill-level DB in which a driving skill-level determined by the driving skill-level determination unit is stored, and a distribution information control unit that distributes driving assistance information based on the driving skill-level stored in the driving skill-level DB to the in-vehicle terminal. The driving skill-level determination unit determines a driving skill-level of a driver based on the running history stored in the running history DB and a driving skill element definition list representing a difficulty level of driving predefined for each driving skill element.

9 Claims, 20 Drawing Sheets

(51) Int. Cl.
  *G01C 21/34*   (2006.01)
  *G08G 1/0968*  (2006.01)
  *G08G 1/00*    (2006.01)
  *G08G 1/01*    (2006.01)
  *G08G 1/0967*  (2006.01)
  *G06F 16/22*   (2019.01)
  *G06F 16/29*   (2019.01)
  *G09B 9/042*   (2006.01)
  *G09B 19/16*   (2006.01)
  *G09B 9/052*   (2006.01)

(52) U.S. Cl.
  CPC ......... *G01C 21/3461* (2013.01); *G06F 16/22* (2019.01); *G06F 16/29* (2019.01); *G08G 1/00* (2013.01); *G08G 1/0112* (2013.01); *G08G 1/0129* (2013.01); *G08G 1/096775* (2013.01); *G08G 1/096888* (2013.01); *B60W 2050/0077* (2013.01); *B60W 2050/0083* (2013.01); *B60W 2050/0089* (2013.01); *B60W 2540/30* (2013.01); *G09B 9/042* (2013.01); *G09B 9/052* (2013.01); *G09B 19/167* (2013.01)

(58) Field of Classification Search
  CPC .. B60W 2050/0083; B60W 2050/0077; G08G 1/0129; G08G 1/096775; G08G 1/0112; G08G 1/00; G08G 1/096888; G01C 21/3461; G06F 16/29; G06F 16/22; G09B 9/052; G09B 19/167; G09B 9/042
  See application file for complete search history.

(56) References Cited

U.S. PATENT DOCUMENTS

| | | | |
|---|---|---|---|
| 2014/0088815 A1* | 3/2014 | Kitagishi | B60W 50/0098 701/29.1 |
| 2017/0059339 A1 | 3/2017 | Sugawara et al. | |
| 2018/0047091 A1* | 2/2018 | Ogden | G01C 21/3484 |

FOREIGN PATENT DOCUMENTS

| | | |
|---|---|---|
| JP | 2011-107977 A | 6/2011 |
| JP | 2012-128655 A | 7/2012 |
| JP | 2014-16713 A | 1/2014 |
| JP | 2014-66521 A | 4/2014 |
| JP | 2017-49044 A | 3/2017 |
| WO | WO 2014/053019 A1 | 4/2014 |

OTHER PUBLICATIONS

Japanese-language Office Action issued in Japanese Application No. 2017-175071 dated Jun. 29, 2021 with English translation (10 pages).

* cited by examiner

FIG. 3

DESTINATION LIST

| TRAVEL ITINERARY ID 301 | TRAVEL DATE 302 | DESTINATION NAME 303 | DESTINATION COORDINATES 304 | TRAVEL ORDER 305 |
|---|---|---|---|---|
| 200 | 2017/01/02 | ○○ PLATEAU | 35.691701, 139.756807 | 1 |
| 200 | 2017/01/02 | yy PARK | 35.6923451, 139.733560 | 2 |
| 200 | 2017/01/02 | xx CAFE | 35.769101, 139.175807 | 3 |

FIG. 4

DRIVING SKILL ELEMENT DEFINITION LIST

| SKILL CLASSIFICATION | Lv1 | Lv2 | Lv3 | Lv4 |
|---|---|---|---|---|
| LANE MOVEMENT | PASS TWO LANES | PASS THREE LANES OR MORE | MOVE TO ADJACENT LANE | MOVE TWO LANES OR MORE |
| JUNCTION | LEAVE FROM EXIT | PASS THROUGH EXIT | ENTER FROM ENTRANCE | USE DURING TRAFFIC JAM |
| RIGHT TURN | RIGHT TURN WITHOUT SIGNAL | OPPOSITE SINGLE-LANE ROAD WITH SIGNAL | OPPOSITE DOUBLE-LANE ROAD WITH SIGNAL | LARGE AMOUNT OF TRAFFIC VOLUME/OPPOSITE DOUBLE-LANE ROAD |
| EXPRESSWAY | RUNNING DISTANCE: xx Km | PASS THROUGH TOLLGATE | PASS THROUGH JCT | MOVEMENT BY JCT |
| METROPOLITAN EXPRESSWAY | RUNNING DISTANCE: xx Km | PASS THROUGH TOLLGATE | PASS THROUGH JCT | MOVEMENT BY JCT |
| MOUNTAIN PATH | RUNNING DISTANCE: xx Km | RUNNING DOWNHILL ROAD: xx Km | CURVATURE OF ROAD: XX OR MORE | ROAD WIDTH: xx OR NARROWER |

DRIVING SKILL-LEVEL DB * VALUE IS Lv

| USER ID | LANE MOVEMENT | JUNCTION | RIGHT TURN | EXPRESSWAY | METROPOLITAN EXPRESSWAY | MOUNTAIN PATH |
|---|---|---|---|---|---|---|
| 100 | 2 | 2 | 4 | 4 | 2 | 2 |
| 101 | 3 | 3 | 3 | 2 | 0 | 1 |
| 102 | 4 | 1 | 3 | 2 | 0 | 3 |

FIG. 6

ATTENTION POINT LIST * SPECIFIC ATTENTION POINT INFORMATION

| TRAVEL ITINERARY ID (601) | ATTENTION POINT ID (602) | DRIVING SKILL CLASSIFICATION (603) | DIFFICULTY LEVEL (604) | COORDINATES (605) |
|---|---|---|---|---|
| 200 | 1 | LANE MOVEMENT | 4 | x, y |
| 200 | 2 | RIGHT TURN | 2 | x, y |

FIG. 7

DRIVING SKILL-LEVEL REQUIREMENT * VALUE IS Lv

| TRAVEL ITINERARY ID | LANE MOVEMENT | MERGING /ENTRANCE | RIGHT TURN AT OPPOSITE DOUBLE-LANE ROAD | EXPRESSWAY | METROPOLITAN EXPRESSWAY | MOUNTAIN PATH |
|---|---|---|---|---|---|---|
| 200 | 4 | 2 | 4 | 4 | 0 | 0 |
| 201 | 3 | 3 | 3 | 4 | 3 | 0 |

FIG. 8
PRACTICE POINT LIST *SPECIFIC PRACTICE POINT INFORMATION

| PRACTICE POINT ID (801) | DRIVING SKILL CLASSIFICATION (802) | DIFFICULTY LEVEL (803) | COORDINATES (804) |
|---|---|---|---|
| 1 | LANE MOVEMENT | 4 | x, y |
| 2 | RIGHT TURN | 2 | x, y |

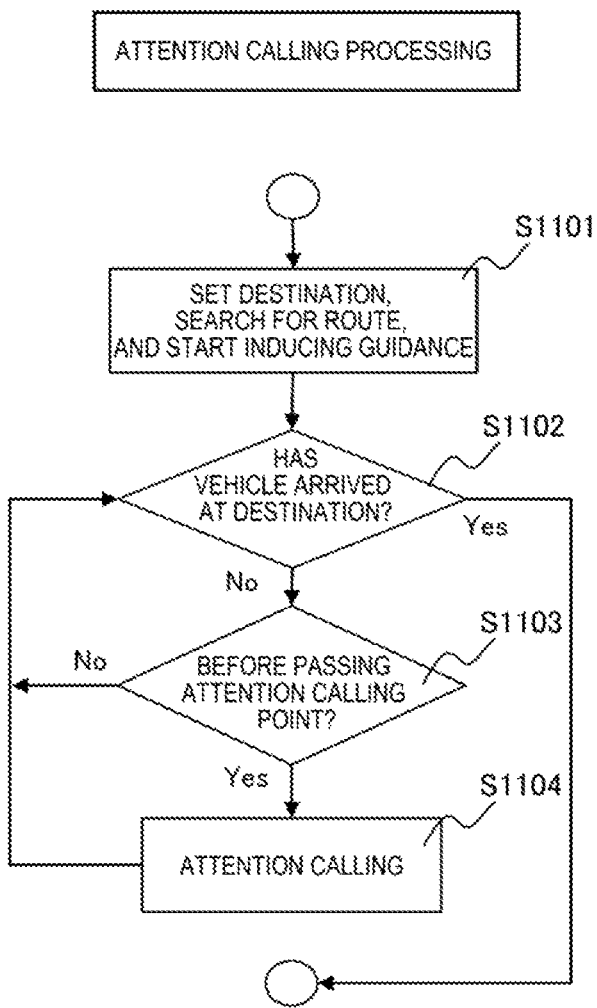

INFORMATION SYSTEM, DRIVING ASSISTANCE INFORMATION PROVIDING METHOD, AND IN-VEHICLE TERMINAL

BACKGROUND OF THE INVENTION

1. Field of the Invention

The present invention relates to an information system, a driving assistance information providing method, and an in-vehicle terminal.

2. Background Art

In recent years, the number of drivers who do not own private cars and use services such as rental car and car sharing as needed is increasing. Such drivers generally have a lower driving frequency and are unfamiliar with driving than drivers who own private cars. In addition, since such drivers are often used for shopping in the vicinity of home as the purpose of using the service, the drivers can drive without anxiety along a fixed route in the vicinity of the home, but may be feel anxiously when traveling away. Accordingly, there is an increasing need to provide driving assistance information in consideration of a driving skill-level for drivers who are unfamiliar with driving.

For example, a technique is disclosed in JP-A-2017-49044 (PTL 1) in which a server cost recognition correction element provided in a navigation server evaluates, for at least one of a plurality of indices representing one or both of a road environment of a subject segment and a relative relationship between the subject segment and one or more of other segments included in the server route candidate, a segment cost index value representing a traffic difficulty of the subject segment, and corrects a cost of the subject segment using the segment cost index value of the subject segment.

SUMMARY OF THE INVENTION

In the technique according to the related art disclosed in PTL 1, the driver can search for a route by avoiding a route in which a degree of burden to be felt by drivers is estimated to be high. However, it is not possible to provide driving assistance information in consideration of a driving skill-level for drivers who are unfamiliar with driving.

An information system according to the invention includes an in-vehicle terminal that is mounted on a vehicle, and a server that communicates with the in-vehicle terminal. The server includes a running history database in which a running history of the vehicle is stored for each driver, a driving skill-level determination unit that determines a driving skill-level of the driver for each of driving skill elements, based on the running history stored in the running history database and a driving difficulty level predefined for each driving skill element, a driving skill-level database that stores the driving skill-level determined for each of the driving skill elements by the driving skill-level determination unit, and a distribution information control unit that distributes driving assistance information based on the driving skill-level stored in the driving skill-level database to the in-vehicle terminal.

A driving assistance information providing method of providing driving assistance information from a server to an in-vehicle terminal according to the invention includes: storing a running history of a vehicle mounted with the in-vehicle terminal for each driver in the server; determining a driving skill-level of the driver for each of driving skill elements in the server, based on the running history and a driving difficulty level predefined for each driving skill element; and distributing driving assistance information based on the driving skill-level from the server to the in-vehicle terminal.

An in-vehicle terminal that is mounted on a vehicle according to the invention includes: a running history acquisition unit that acquires a running history of the vehicle; a communication unit that transmits the running history acquired by the running history acquisition unit to the server in association with a driver of the vehicle and receives driving assistance information distributed from the server; and a driving assistance unit that assists driving of the driver according to a driving skill-level of the driver for each of driving skill elements, based on the driving assistance information received by the communication unit.

According to the invention, it is possible to provide driving assistance information in consideration of a driving skill-level for drivers who are unfamiliar with driving.

BRIEF DESCRIPTION OF THE DRAWINGS

FIG. 3 is a diagram illustrating an example of a destination list;

FIG. 4 is a diagram illustrating an example of a driving skill element definition list;

FIG. 5 is a diagram illustrating an example of a driving skill-level DB;

FIG. 6 is a diagram illustrating an example of an attention point list;

FIG. 7 is a diagram illustrating an example of a driving skill-level requirement;

FIG. 8 is a diagram illustrating an example of a practice point list;

FIG. 19 is a diagram illustrating a flowchart of attention calling processing.

DESCRIPTION OF EMBODIMENTS

Figure 1:
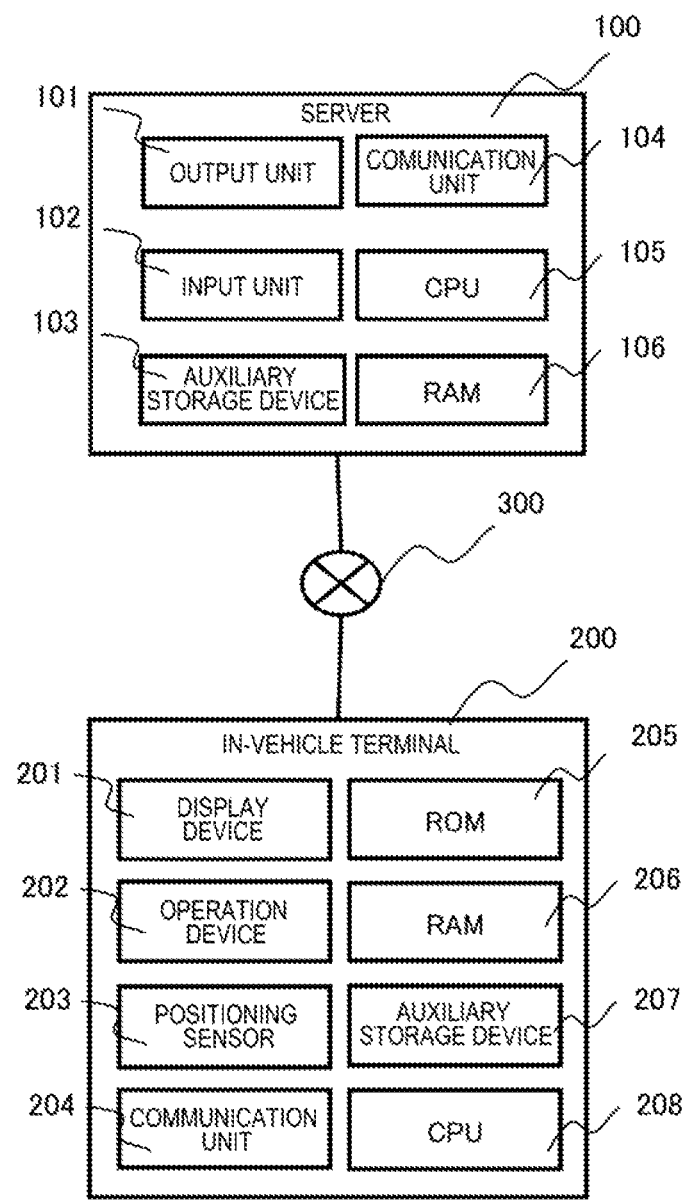
FIG. 1 is a diagram illustrating a hardware configuration of an information system according to an embodiment of the invention.

FIG. 1 is a diagram illustrating a hardware configuration of an information system according to an embodiment of the invention. The information system illustrated in FIG. 1 includes a server 100 and an in-vehicle terminal 200. The server 100 includes an output unit 101, an input unit 102, an auxiliary storage device 103, a communication unit 104, a CPU 105, and a RAM 106. The in-vehicle terminal 200 is an information processing apparatus mounted on a vehicle, and includes a display device 201, an operation device 202, a positioning sensor 203, a communication unit 204, a ROM 205, a RAM 206, an auxiliary storage device 207, and a CPU 208. Hereinafter, the vehicle mounted with the in-vehicle terminal 200 will be referred to as "host vehicle".

The server 100 and the in-vehicle terminal 200 communicate with each other via a network 300 using respectively the communication unit 104 and the communication unit 204. The network 300 includes, for example, a mobile phone line or the Internet.

In the server 100, the output unit 101 is connected to a display (not illustrated), and displays processing results of the CPU 105 on the display. The input unit 102 is connected to an input device (not illustrated) such as a touch panel, a keyboard, or a mouse, and inputs an instruction from the administrator of the server 100 performed using the input device to the server 100. The auxiliary storage device 103 is a storage device that stores application programs or various data used in applications, and includes an HDD or an SSD, for example. The communication unit 104 is connected to the network 300, and exchanges various data with the in-vehicle terminal 200 via the network 300. The CPU 105 is an arithmetic operation and control unit that realizes various functions to be described below in the server 100 by executing a program of an application loaded from the auxiliary storage device 103 onto the RAM 106. The RAM 106 is a storage device that loads the program of the application stored in the auxiliary storage device 103 and temporarily saves data used for the processing of the CPU 105.

In the in-vehicle terminal 200, the display device 201 is a device such as a liquid crystal display or an organic EL display that displays image information. The operation device 202 is a device that accepts an operation of a user such as a driver to the in-vehicle terminal 200, and includes, for example, a button, a switch, a keyboard, and a touch panel. The positioning sensor 203 is a sensor for positioning the location of the host vehicle. The positioning sensor 203 includes, for example, a GPS sensor. The communication unit 204 is connected to the network 300, and communicates with the server 100. The ROM 205 is a read-only storage device in which a control program executed by the CPU 208 is stored. The RAM 206 is a storage device that temporarily saves information used for the processing of the CPU 208. The RAM 206 is used to, for example, when the CPU 208 executes a program of an application stored in the auxiliary storage device 207, load the program or to store temporarily information generated by the program being executed by the CPU 208. The auxiliary storage device 207 is a storage device that stores map data, voice data, application programs for car navigation, and the like, and includes an HDD or an SSD, for example. The CPU 208 is an arithmetic processing unit capable of executing a program, and controls the respective units of the in-vehicle terminal 200 based on the control program stored in the ROM 205. In addition, the CPU 208 executes programs of various applications loaded from the auxiliary storage device 207 onto the RAM 206, and thus causes the in-vehicle terminal 200 to realize various functions of the car navigation, for example.

Figure 2:
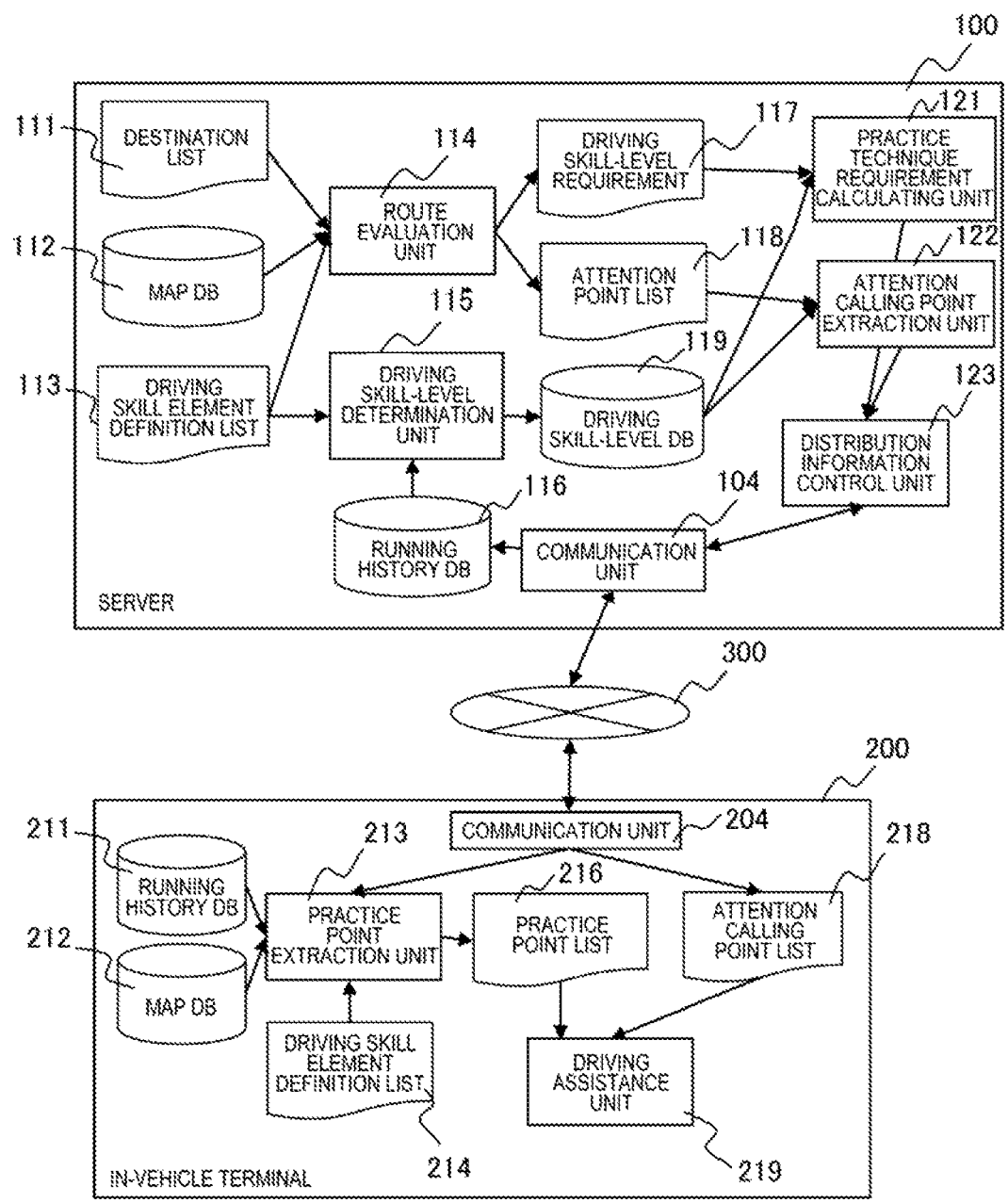
FIG. 2 is a diagram illustrating a system configuration of the information system according to the embodiment of the invention.

FIG. 2 is a diagram illustrating a system configuration of the information system according to the embodiment of the invention. The server 100 includes, as its functions, a map database 112, a route evaluation unit 114, a driving skill-level determination unit 115, a running history database 116, a driving skill-level database 119, a practice technique requirement calculating unit 121, an attention calling point extraction unit 122, a distribution information control unit 123, and a communication unit 104. Further, the server 100 includes information of each of a destination list 111, a driving skill element definition list 113, a driving skill-level requirement 117, and an attention point list 118. Such information and each database (hereinafter, referred to as "DB") of a map database 112, a running history database 116, and a driving skill-level database 119 are stored in the auxiliary storage device 103 in FIG. 1, for example. On the other hand, functional blocks of a route evaluation unit 114, a driving skill-level determination unit 115, a practice technique requirement calculating unit 121, an attention calling point extraction unit 122, and a distribution information control unit 123 are realized as processing to be executed by the CPU 105 in FIG. 1, for example. The communication unit 104 is the same as that illustrated in FIG. 1.

The in-vehicle terminal 200 includes, as its functions, a running history database 211, a map database 212, a practice point extraction unit 213, a driving assistance unit 219, and a communication unit 204. In addition, the in-vehicle terminal 200 includes information of each of a driving skill element definition list 214, a practice point list 216, and an attention calling point list 218. Such information and each database (hereinafter, referred to as "DB") of a running history database 211 and a map database 212 are stored in the auxiliary storage device 207 in FIG. 1. On the other hand, functional blocks of a practice point extraction unit 213 and a driving assistance unit 219 are realized as processing to be executed by the CPU 208 in FIG. 1, for example. The communication unit 204 is the same as that illustrating in FIG. 1.

In the server 100, the destination list 111 is information indicating a list of destinations for which the host vehicle is scheduled to visit. In the server 100, information indicating a destination of a travel destination previously registered by a driver of the host vehicle is stored as the destination list 111. The destination list 111 is used in the route evaluation unit 114. The driver of the host vehicle can set in advance information to be registered in the destination list 111 using an information terminal (not illustrated) such as a PC (personal computer) or a smartphone. The host vehicle is not limited to a private vehicle, but may be a rental car or a vehicle used for car sharing. Therefore, there may be a plurality of drivers for one host vehicle. In FIG. 2, only one in-vehicle terminal 200 connected to the server 100 is illustrated, but a plurality of in-vehicle terminals 200 are connected to one server 100 in an actual information system. In this case, all the vehicles on which the in-vehicle terminal 200 is mounted are treated as a host vehicle. Therefore, information on destinations individually registered by a plurality of drivers is recorded in the destination list 111.

The map DB 112 saves map data used for route calculation of the host vehicle or the like in the route evaluation unit 114.

The driving skill element definition list 113 is information indicating road conditions and traffic conditions, in which a driver unfamiliar with driving or a driver with inexperienced driving skills tends to feel the driving load when driving the host vehicle, together with the difficulty level of driving. The server 100 stores, as the driving skill element definition list 113, a relation between the road conditions or the traffic conditions predefined for each driving skill element and the difficulty level of driving. The driving skill element definition list 113 is used in the route evaluation unit 114 and the driving skill-level determination unit 115.

The route evaluation unit 114 calculates the driving skill-level requirement 117 and the attention point list 118 based on the destination list 111, the map DB 112, and the driving skill element definition list 113. The driving skill-level requirement 117 is information indicating a driving skill-level for each the driving skill element required when the host vehicle runs along a route to the destination registered in the destination list 111. The attention point list 118 is information indicating a list of an attention point, that is, a point on a specific route at which a driver who is deficient in driving skill when the host vehicle runs along the route to the destination registered in the destination list 111.

The running history DB 116 saves a running history of the host vehicle for each driver. As described above, when there are the plurality of driver for one host vehicle, or when a plurality of host vehicles are connected to the server 100, the running history of all of these drivers is recorded in the running history DB 116 for each driver. The driving skill-level determination unit 115 determines the driving skill-level for each driver for each driving skill element based on the running history stored in the running history DB 116 and the riving skill element definition list 113, and stores it in the driving skill-level DB 119.

The practice technique requirement calculating unit 121 calculates practice technique requirement that the driver should practice beforehand, based on the driving skill-level requirement 117 and the driving skill-level of each driver stored in the driving skill-level DB 119. Here, when the host vehicle runs along the route to the destination registered in the destination list 111, the driving skill element whose driver's experience is insufficient on the route is specified from the driving skill-level of the driver, and thus the practice technique requirements are calculated.

The attention calling point extraction unit 122 extracts an attention calling point, at which an attention is called to the driver of the host vehicle, based on the attention point list 118 and the driving skill-level of each driver stored in the driving skill-level DB 119. Here, the attention calling point extraction unit determines the presence or absence of the attention point, at which the experience of the driving skill-level necessary for driving from the driving skill-level of the driver is insufficient, from each of the attention points represented by the attention point list 118, and extracts a corresponding attention point as an attention calling point.

The distribution information control unit 123 distributes driving assistance information based on the driving skill-level of each driver stored in the driving skill-level DB 119 to the in-vehicle terminal 200, using the communication unit 104. The distribution information control unit 123 distributes, according to the access from the in-vehicle terminal 200, driving assistance information including either of information on the practice technique requirement calculated by the practice technique requirement calculating unit 121 or information on the attention calling point extracted by the attention calling point extraction unit 122. For example, the scheduled date on which the host vehicle is going to the destination registered in the destination list 111 is compared with the current date on which the access from the in-vehicle terminal 200 is performed. As a result, when the current date is earlier than the date scheduled to be going to the destination, driving assistance information including information on the practice technique requirements is distributed, and when the current date matches the date scheduled to be going to the destination, that is, the current date is the date of a travel schedule, driving assistance information including information on the attention calling point is distributed.

In in-vehicle terminal 200, the running history DB 211 saves the running history of the host vehicle, which is mounted with the in-vehicle terminal 200, classified for each driver who has driven the host vehicle. As described above, when there are the plurality of driver for one host vehicle, the running history for all the drivers is recorded in the running history DB 211 for each driver. Alternatively, when the driver starts using the host vehicle, the running history of the driver recorded in the running history DB 116 of the server 100 may be downloaded from the server 100 to the in-vehicle terminal 200, and may be recorded in the running history DB 211. In this case, it is preferable to erase the running history DB 211 after each driver uploads the running history to the server 100 and ends the use of the host vehicle.

Similar to the map DB 112 of the server 100, the map DB 212 saves map data. The driving skill element definition list 214 is information as in the driving skill element definition list 113 of the server 100, and is used in the practice point extraction unit 213.

When the driving assistance information including the information on the practice technique requirement described above is distributed from the server 100, the communication unit 204 receives the driving assistance information and outputs it to the practice point extraction unit 213. The practice point extraction unit 213 extracts the practice point list 216, based on the information on the practice technique requirement in the driving assistance information received from the server 100, the running history DB 211, the map DB 212, and the driving skill element definition list 214. The practice point list 216 is information indicating a list of practice points, which are specific points at which the driver practices beforehand the practice technique requirements.

On the other hand, when the driving assistance information including the information on the attention calling point described above is distributed from the server 100, the communication unit 204 receives the driving assistance information and outputs the attention calling point list 218 to the driving assistance unit 219. The attention calling point list 218 is information indicating a list of attention calling points extracted by the attention calling point extraction unit 122 of the server 100. That is, the attention calling point list 218 indicates a point at which an attention-calling should be issued to the driver of the host vehicle with insufficient experiences at a point requiring driving skill elements.

The driving assistance unit 219 performs driving assistance for the driver of the host vehicle, based on the practice point list 216 or the attention calling point list 218. Specifically, when the practice point list 216 is input, the driving assistance unit 219 searches for a route including practice points, as a practice route. For example, when the host vehicle approaches in front of one of the practice points indicated by the practice point list 216, the driving assistance unit 219 sets the practice point to the destination or the waypoint, thereby searching for the practice route. Then, the driving assistance unit 219 guides the host vehicle along the searched practice route and assists the driver to obtain driving experience at the practice point, thereby performing driving assistance.

On the other hand, when the attention calling point list 218 is input, the driving assistance unit 219 performs driving assistance by issuing attention-calling to the driver with respect to the attention calling point indicated by the attention calling point list 218. For example, when the host vehicle approaches in front of any of the attention calling points indicated by the attention calling point list 218, the driving assistance unit 219 notifies the driver of the image or sound that assists the driving of the driver, who is unfamiliar with driving at the attention calling point, according to the required driving skill elements.

Specific examples of information and respective DBs described in FIG. 2 will be described below with reference to FIGS. 3 to 8.

FIG. 3 is a diagram illustrating an example of the destination list 111. In the destination list 111 illustrated in FIG. 3, information on each of a travel itinerary ID 301, a travel date 302, a destination name 303, a destination coordinate 304, and a travel order 305 is stored for each destination. The travel itinerary ID 301 is information indicating a value that can uniquely identify the travel itinerary in which the host vehicle goes to the destination. In the case of a plan to visit a plurality of destinations in one travel itinerary, a common value is set for the respective travel IDs 301 corresponding to these destinations. The travel date 302 is information indicating the date on which the host vehicle is scheduled to go to the destination. The destination name 303 is information indicating the name of the destination. The destination coordinate 304 is information indicating coordinates of the destination. The travel order 305 is information indicating a visiting order to the destination in the travel itinerary. That is, when a visit to a plurality of destinations is scheduled in one travel itinerary, a value of the travel order 305 is set according to the visiting order in the travel itinerary. In FIG. 3, separate contents for each driver are stored in the server 100 as the destination list 111, an example of the destination list 111 of a certain driver is illustrated, but the information on destinations related to all drivers may be combined into one destination list 111. In this case, it is preferable to be able to identify the driver's destination information by a method of assigning a different ID number to each driver.

FIG. 4 is a diagram illustrating an example of the driving skill element definition lists 113 and 214. In the driving skill element definition lists 113 and 214 illustrated in FIG. 4, information on each of a skill classification 401 and difficulty levels 402 to 405 is stored for each driving skill element. The skill classification 401 is information indicating a classification of the driving skill element. The difficulty levels 402 to 405 are information indicating contents of road conditions and traffic conditions defining difficulty levels of driving for the driving skill element, and the difficulty levels of driving are represented by level 1 (Lv1) to level 4 (Lv4). That is, the higher the level number, the higher the difficulty level of driving.

FIG. 5 is a diagram illustrating an example of the driving skill-level DB 119. In the driving skill-level DB 119 illustrated in FIG. 5, information on each of a user ID 501 and driving skill-levels 502 to 507 is stored for each driver. The user ID 501 is information indicating a value that can uniquely identify each driver. The driving skill-levels 502 to 507 are information indicating driving skill-levels of the driver, and are driving skill-levels represented by one of level values 1 to 4 for each of the driving skill elements defined in the driving skill element definition list 113. The level values of the driving skill-levels 502 to 507 correspond to the level values defined by the difficulty levels 402 to 405 of the driving skill element definition list 113 in FIG. 4. In the example in FIG. 5, for example, for the driver having the value of the user ID 501 being 100, a value of the driving skill-level 502 corresponding to the driving skill element of "lane movement" is 2. For this reason, this indicates that such a driver has already learned a driving skill of level 2 with respect to the lane movement, that is, the driving skill of "passing three or more lanes" indicated in the difficulty level 403 of the row in which the content of the skill classification 401 in table of FIG. 4 is "lane movement".

The level value of the driving skill-level of each driver in the driving skill-level DB 119 in FIG. 5 is determined by the driving skill-level determination unit 115 as described above. At this time, the driving skill-level determination unit 115 determines whether the driver of the host vehicle has run in the past along a locating corresponding to the driving skill element defined for each level in the driving skill element definition list 113, based on the running history stored in the running history DB 116, thereby calculating a level value of the driving skill-level of each driver.

FIG. 6 is a diagram illustrating an example of the attention point list 118. In the attention point list 118 illustrated in FIG. 6, information on each of a travel itinerary ID 601, an attention point ID 602, a driving skill classification 603, a difficulty level 604, and a coordinate 605 is stored for each of the attention points. The travel itinerary ID 601 is information indicating a value that can uniquely identify the travel itinerary in which the host vehicle passes through the attention point, and corresponds to the travel itinerary ID 301 of the destination list 111 illustrated in FIG. 3. The attention point ID 602 is information indicating a value that can uniquely identify the attention point. The driving skill classification 603 is information indicating a classification of the driving skill elements corresponding to the attention points, and corresponds to the skill classification 401 of the driving skill element definition list 113 illustrated in FIG. 4. The difficulty level 604 is represented by one of difficulty levels 1 to 4 of driving at the attention point. The level value of the difficulty level 604 corresponds to the level value, which is defined for the classification of the driving skill elements indicated by the driving skill classification 603, among the difficulty levels 402 to 405 of the driving skill element definition list 113 illustrated in FIG. 4. The coordinate 605 is information indicating coordinates of the attention point. In the case where the attention point is appropriately treated as link information, for example, when the classification of the driving skill elements indicated by the driving skill classification 603 is "lane movement", a link ID and a point-sequence coordinate value may be stored in the coordinate 605.

The attention point list 118 in FIG. 6 is used when the attention calling point extraction unit 122 extracts the attention calling points as described above. At this time, the attention calling point extraction unit 122 compares the values of the driving skill-levels 502 to 507 in the driving skill-level DB 119 illustrated in FIG. 5 with the values of the driving skill classification 603 and the difficulty level 604 in the attention point list 118 of FIG. 6, for the driver who is a target of distribution of the driving assistance information. Thus, from the attention points represented by the attention point list 118, the attention point requiring the driving skill element in which the driver's experience is insufficient is specified, and is extracted as an attention calling point. Therefore, the attention calling point list 218 output from the communication unit 204 to the driving assistance unit 219 in the in-vehicle terminal 200 is also configured by the same information as the attention point list 118 illustrated in FIG. 6.

FIG. 7 is a diagram illustrating an example of the driving skill-level requirement 117. In the driving skill-level requirement 117 illustrated in FIG. 7, information on each of the travel itinerary ID 701 and the difficulty levels 702 to 707 is stored for each travel itinerary. The travel itinerary ID 701 is information indicating a value that can uniquely identify the travel itinerary in which the host vehicle passes through the attention point, and corresponds to the travel itinerary ID 301 of the destination list 111 illustrated in FIG. 3. The difficulty levels 702 to 707 are information indicating the driving skill-level necessary for the driver to drive the host vehicle according to the travel itinerary, and is represented by one of driving skill-levels 1 to 4 required for each of the driving skill elements defined in the driving skill element definition list 113. Similarly to the driving skill-levels 502 to 507 in the driving skill-level DB 119 illustrated in FIG. 5, the level values of the difficulty levels 702 to 707 correspond to the level values of the difficulty levels 402 to 405 in the driving skill element definition list 113 illustrated in FIG. 4.

The driving skill-level requirement 117 in FIG. 7 is used when the practice technique requirement calculating unit 121 calculates the practice technique requirements as described above. At this time, the practice technique requirement calculating unit 121 compares the values of the driving skill-levels 502 to 507 in the driving skill-level DB 119 illustrated in FIG. 5 with the values of the difficulty levels 702 to 707 in the driving skill-level requirement 117 of FIG. 7, for the driver who is a target of distribution of the driving assistance information. Thus, a combination of the driving skill element and the driving skill-level in which the driver's experience is insufficient is specified out of the combination of the driving skill element and the driving skill-level represented by the driving skill-level requirement 117, and is extracted as a practice technique requirement. Therefore, the information of the practice technique requirement distributed to the in-vehicle terminal 200 from the server 100 is also configured by the same information as the driving skill-level requirement 117 illustrated in FIG. 7.

FIG. 8 is a diagram illustrating an example of the practice point list 216. In the practice point list 216 illustrated in FIG. 8, information on each of a practice point ID 801, a driving skill classification 802, a difficulty level 803, and a coordinate 804 is stored for each of the practice points. The practice point ID 801 is information indicating a value that can uniquely identify the practice point. The driving skill classification 802 is information indicating a classification of the driving skill elements corresponding to the practice points, and corresponds to the skill classification 401 of the driving skill element definition list 113 illustrated in FIG. 4. The difficulty level 803 is represented by one of difficulty levels 1 to 4 of driving at the practice point. Similarly to the difficulty level 604 in the attention point list 118 of FIG. 6, the level value of the difficulty level 803 corresponds to the level value, which is defined for the classification of the driving skill elements indicated by the driving skill classification 802, among the difficulty levels 402 to 405 of the driving skill element definition list 113 illustrated in FIG. 4. The coordinate 804 is information indicating coordinates of the practice point. Similarly to the coordinate 605 in the attention point list 118 of FIG. 6, in the case where the practice point is appropriately treated as link information, for example, when the classification of the driving skill elements indicated by the driving skill classification 802 is "lane movement", a link ID and a point-sequence coordinate value may be stored in the coordinate 804.

A specific example of the driving assistance performed by the information system according to the embodiment will be described with reference to FIGS. 9 to 18 together with operations of the respective functional blocks of the server 100 and the in-vehicle terminal 200 illustrated in FIG. 2.

Figure 9:
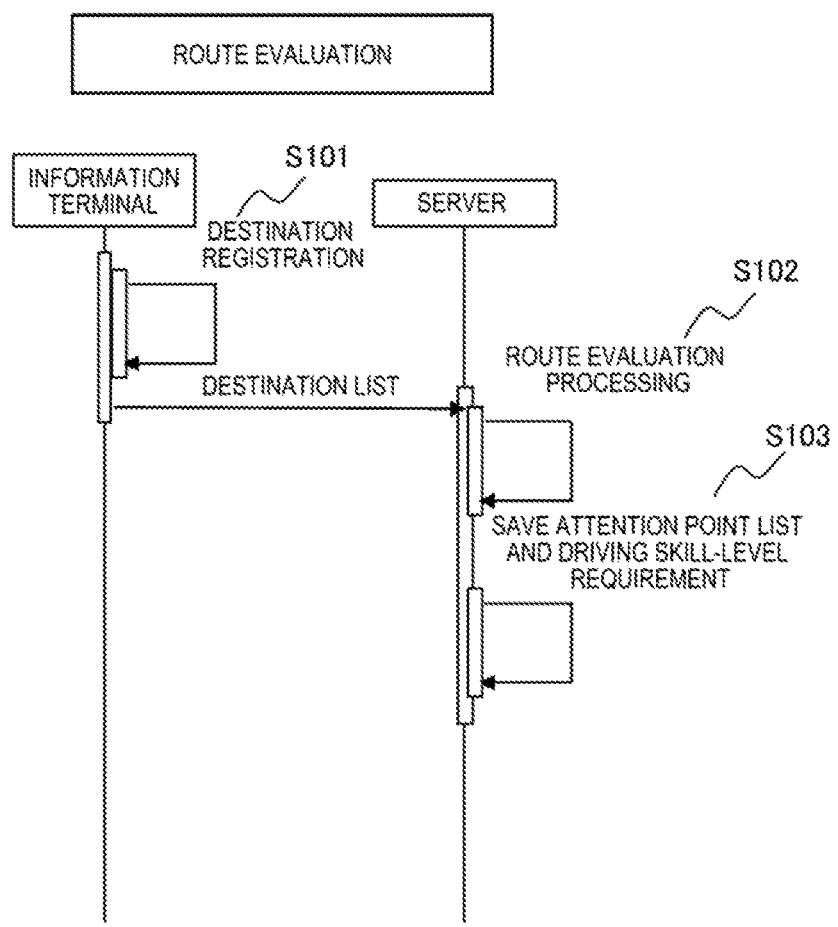
FIG. 9 is a sequence diagram of route evaluation.

FIG. 9 is a sequence diagram of route evaluation performed by the information system in order to evaluate the degree of necessity of driving assistance with respect to a scheduled running route of the host vehicle.

In step S101, the driver of the host vehicle inputs information on the scheduled travel destination to the information terminal (not illustrated) such as a PC or a smartphone. The information on the destination input in step S101 is transmitted to the server 100 as a destination list. The destination list transmitted from the information terminal to the server 100 is saved, as the destination list 111 illustrated in FIG. 3, in the server 100.

In step S102, the route evaluation unit 114 of the server 100 executes route evaluation processing based on the information on the destination indicated by the destination list 111. In the route evaluation processing, the route evaluation unit 114 calculates the attention point list 118 and the driving skill-level requirement 117. Here, the route to the destination registered in the destination list 111 is searched, and the point to be noticed by the driver on the route is specified as the attention point, whereby the attention point list 118 is calculated. Further, the driving skill-level requirement 117 is calculated by obtaining the driving skill-level required for the driver to drive the host vehicle according to the route. The details of step S102 are illustrated in FIG. 10.

In step S103, the route evaluation unit 114 saves the attention point list 118 and the driving skill-level requirement 117 calculated in step S102.

Figure 10:
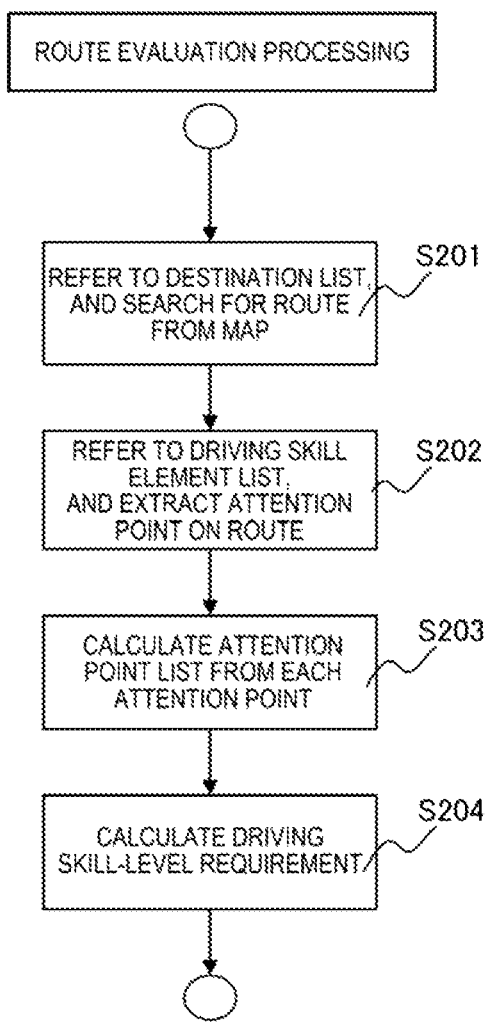
FIG. 10 is a diagram illustrating a flowchart of route evaluation processing.

FIG. 10 is a diagram illustrating a flowchart of the route evaluation processing to be executed in step S102 of FIG. 9.

In step S201, the route evaluation unit 114 refers to the destination list 111, and searches for the route from a departure point to the destination using the map DB 112. A destination having the same travel itinerary ID 301 in the destination list 111 is set as one travel itinerary, the destinations are sequentially set according to the information of the travel order 305, and using the map DB 112, a route from the departure point to the final destination via each destination is calculated. For example, in the case of the destination list 111 illustrated in FIG. 3, a destination "OO plateau" in a first row where the value of the travel order 305 is land a destination "yy park" in a second row where the value of the travel order 305 is 2 are set as waypoints, respectively, and a destination "xx cafe" in a third row where the value of the travel order 305 is 3 is set as a final destination. In the departure point of this route, it is preferable to preset the parking lot or home where the vehicle is located on that day. Further, the route from the departure point to the final destination may be searched by calculating a route from the departure point to the first destination, searching for a route for each destination in such a manner that a route to the next destination is searched by setting the destination as a departure point, and linking the obtained routes according to the travel order.

In step S202, the route evaluation unit 114 refers to the driving skill element definition list 113, and extracts the attention point corresponding to the route calculated in step S201. Here, the presence or absence of a point corresponding to the road conditions or the traffic conditions defined by the difficulty levels 402 to 405 in FIG. 4 is determined with respect to each road on the route, and if it is determined that there is a corresponding point, the point is extracted as an attention point. In this way, each point having a high operation load on the route is extracted as an attention point.

In step S203, the route evaluation unit 114 calculates the attention point list 118 representing each attention point extracted in step S202. Here, the classification and the difficulty level of the driving skill element corresponding to each of the attention points are specified from the driving skill element definition list 113, and these types of specified information are combined with the coordinate value and ID of each attention point, whereby the attention point list 118 as illustrated in FIG. 6 is calculated.

In step S204, the route evaluation unit 114 calculates the driving skill-level requirement 117 for each travel itinerary based on the attention point list 118 calculated in step S203. Here, the maximum difficulty level among the attention points on the route in the travel itinerary is specified from the attention point list 118 with respect to each travel itinerary indicated by the destination list 111. Then, the maximum difficulty level for each specified driving skill element is summarized for each travel itinerary, and thus the driving skill-level requirement 117 as illustrated in FIG. 7 is calculated. After step S204 is executed, the route evaluation unit 114 ends the processing flow of FIG. 10.

Figure 11:
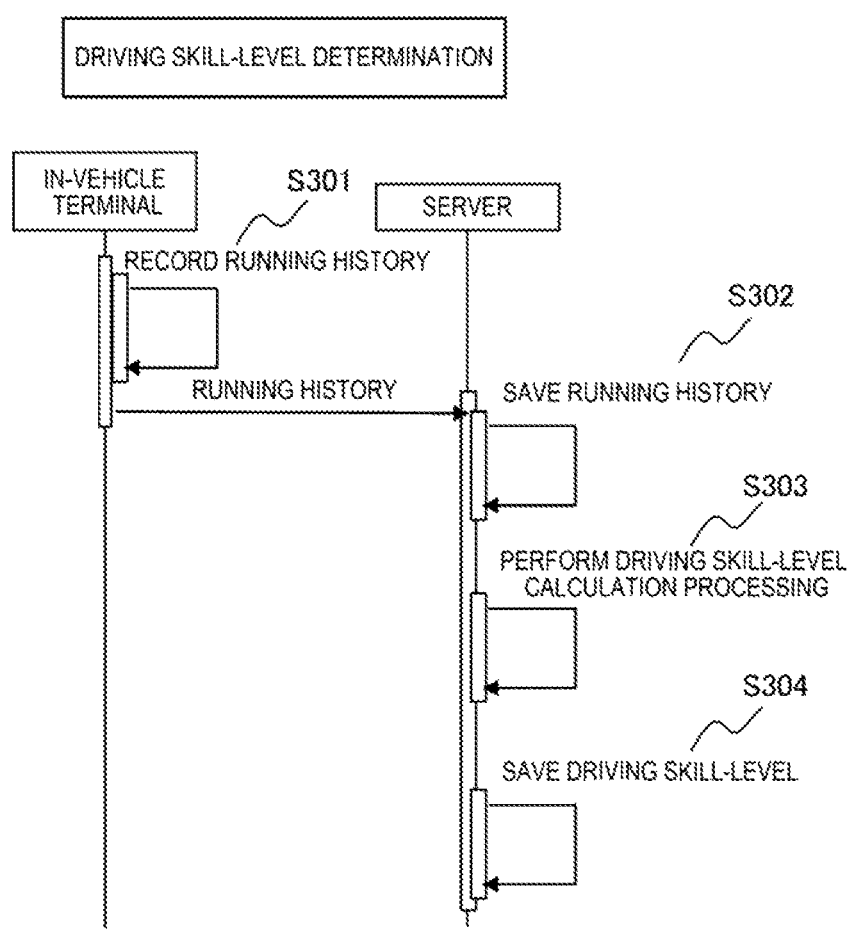
FIG. 11 is a sequence diagram of driving skill-level determination.

FIG. 11 is a sequence diagram of the driving skill-level determination performed by the information system to obtain the driving skill-level of the driver from the running history of the host vehicle.

In step S301, the in-vehicle terminal 200 records the running history of the host vehicle in the running history DB 211 in association with the driver. The running history recorded in step S301 is transmitted to the server 100 at a predetermined timing, for example, at the time of power-on or disconnection of the in-vehicle terminal 200.

In step S302, the server 100 saves the running history received from the in-vehicle terminal 200 in the running history DB 116 for each driver.

In step S303, the driving skill-level determination unit 115 of the server 100 performs driving skill-level calculation processing based on the running history saved in the running history DB 116. Here, the number of times of experience for each driving skill element defined in the driving skill element definition list 113 is counted for each driver based on the running history of each driver saved in the running history DB 116, and thus the driving skill-level is calculated for each driving skill element of each driver. The details of step S303 are illustrated in FIG. 12.

In step S304, the driving skill-level determination unit 115 saves the driving skill-level calculated for each driving skill element in step S303 in the driving skill-level DB 119.

Figure 12:
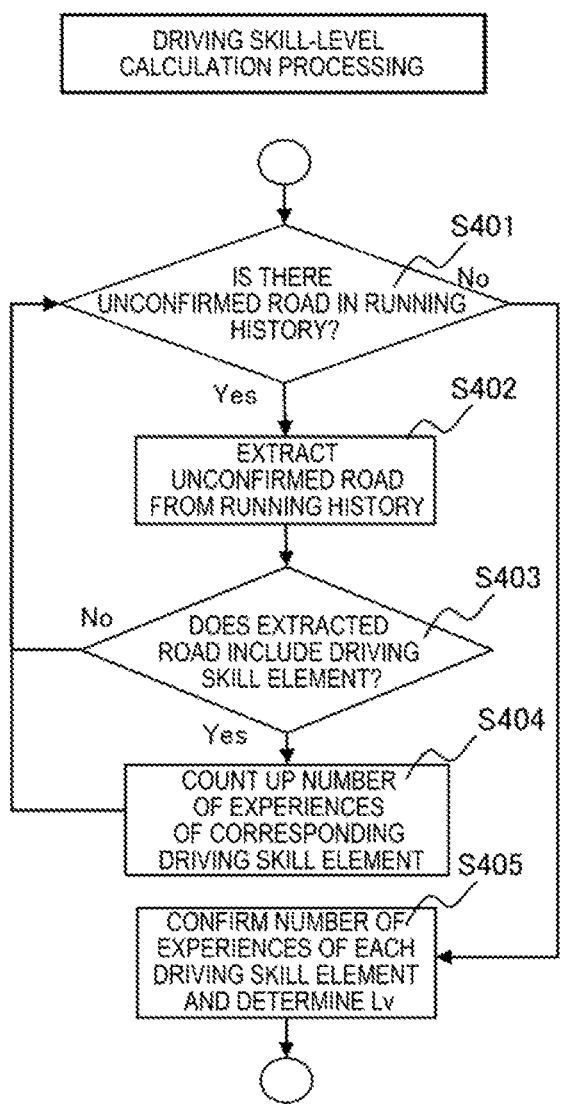
FIG. 12 is a diagram illustrating a flowchart of driving skill-level calculation processing.

FIG. 12 is a flowchart of the driving skill-level calculation processing to be executed in step S303 of FIG. 11. When the running histories of a plurality of drivers are saved in the running history DB 116, the driving skill-level determination unit 115 performs the processing flow of FIG. 12 for each driver.

In step S401, the driving skill-level determination unit 115 reads the running history from the running history DB 116, and determines the presence or absence of an unconfirmed road in the running history. As a result, if there is an unconfirmed road, the process of step S402 is performed, and if all the roads have been confirmed, the process of step S405 is performed.

In step S402, the driving skill-level determination unit 115 extracts the unconfirmed road determined in step S401 from the running history DB 116. At this time, unconfirmed roads may be extracted as a road string obtained by grouping a plurality of roads. For example, it is possible to extract unconfirmed road strings in units that are easy to process, for example, by dividing at certain distances or intersections.

In step S403, the driving skill-level determination unit 115 confirms whether the road extracted in step S402 includes a place corresponding to one of the driving skill elements defined in the driving skill element definition list 113. When the corresponding place is not on the road, the process directly returns to step S401. When the corresponding place is on the road, after counting up the number of times of experience with respect to the driving skill elements of the place in step S404, the process returns to step S401. That is, if there are places corresponding to any one of the road conditions and the traffic conditions, which are defined by level division for each the driving skill element in the driving skill element definition list 113 illustrated in FIG. 4, on the extracted road, the number of times of experience of the level of the driving skill element is counted up by one. When the extracted road corresponds to a plurality of driving skill elements, it is preferable to count up the number of times of experience of each driving skill element.

In step S405, the driving skill-level determination unit 115 confirms the number of times of experience of each driving skill element counted up in steps S401 to S404. As a result, if there are driving skill elements of which the number of times of experience of any level is equal to or more than a certain value, the driving skill-level is determined by assuming that master condition for the level of the driving skill element is satisfied. At this time, when higher-level master condition is first satisfied for the same driving skill element, it may be regarded that higher-level master condition is also satisfied. Alternatively, it may be determined that the higher-level master condition is not satisfied until the lower-level master condition is satisfied. Further, in the driving skill element definition list 113, definition is made according to environmental conditions such as traffic volume and weather in addition to the definition based on the road conditions and traffic conditions illustrated in FIG. 4, and it may be determined whether the master condition is satisfied for each level of the driving skill element set for each combination of these definitions. For example, for each of rainy weather, snowfall, and traffic jams, it is possible to determine the driving skill-level according to the environmental situation by determining whether the master conditions are satisfied for each level of the predefined driving skill element. When step S405 is executed, the driving skill-level determination unit 115 ends the processing flow of FIG. 12.

Figure 13:
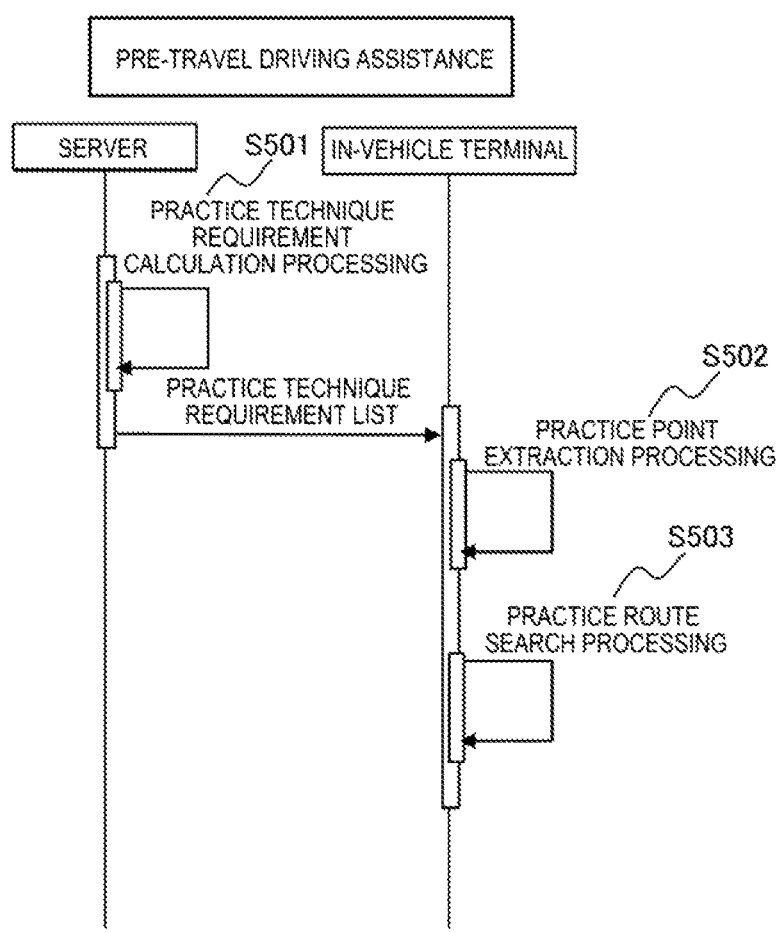
FIG. 13 is a sequence diagram of pre-travel driving assistance.

FIG. 13 is a sequence diagram of pre-travel driving assistance performed by the information system in order to allow the driver to preload the driving experience necessary for the travel before the driver makes a travel to the registered destination. The server 100 executes the pre-travel driving assistance illustrated in the sequence diagram of FIG. 13 when the driver, who registers a destination whose date set on the travel date 302 in the destination list 111 is on or after the next day, gets in the host vehicle and uses the information system.

Figure 14:
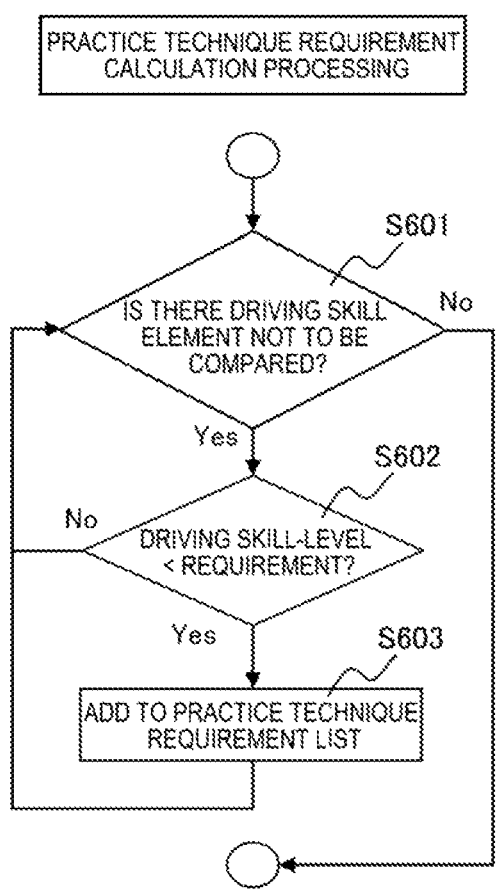
FIG. 14 is a diagram illustrating a flowchart of practice technique requirement calculation processing.

In step S501, the practice technique requirement calculating unit 121 of the server 100 executes the practice technique requirement calculation processing based on the driving skill-level requirement 117 and the driving skill-level of the driver stored in the driving skill-level DB 119. In the practice technique requirement calculation processing, the practice technique requirement calculating unit 121 calculates a practice technique requirement indicating the driving skill element requiring the practice because experience is insufficient in the current driving skill-level when the driver drives the host vehicle to the destination registered in the destination list 111. The details of step S501 are illustrated in FIG. 14. The information of the practice technique requirement calculated in step S501 is distributed to the in-vehicle terminal 200 by the distribution information control unit 123, as the practice technique requirement list included in the driving assistance information.

Figure 15:
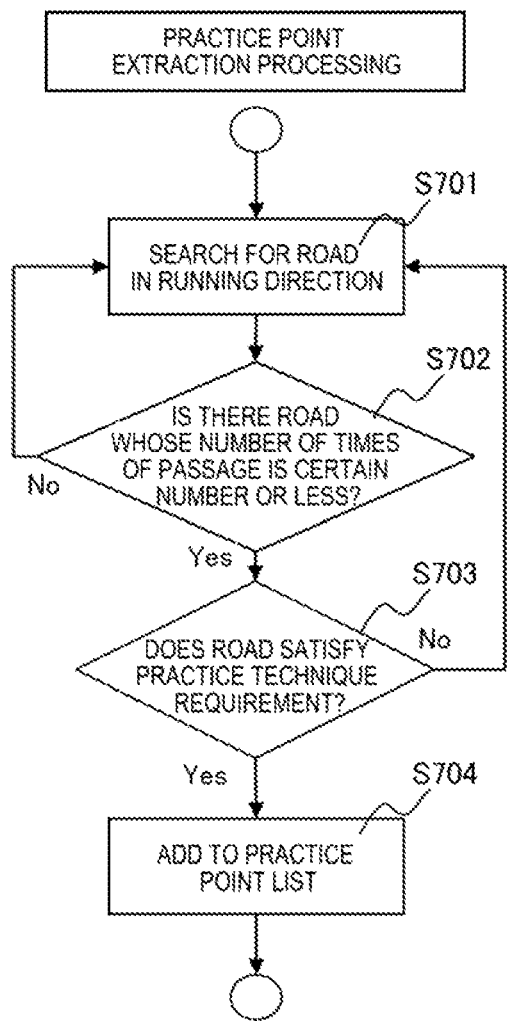
FIG. 15 is a diagram illustrating a flowchart of practice point extraction processing.

In step S502, the practice point extraction unit 213 of the in-vehicle terminal 200 acquires the practice technique requirement list from the driving assistance information distributed from the server 100, and executes practice point extraction processing using this. In the practice point extraction processing, the practice point extraction unit 213 extracts the practice point list 216 based on the acquired practice technique requirement list, the running history of the driver recorded in the running history DB 211, the map DB 212, and the driving skill element definition list 214. The details of step S502 are illustrated in FIG. 15.

Figure 16:
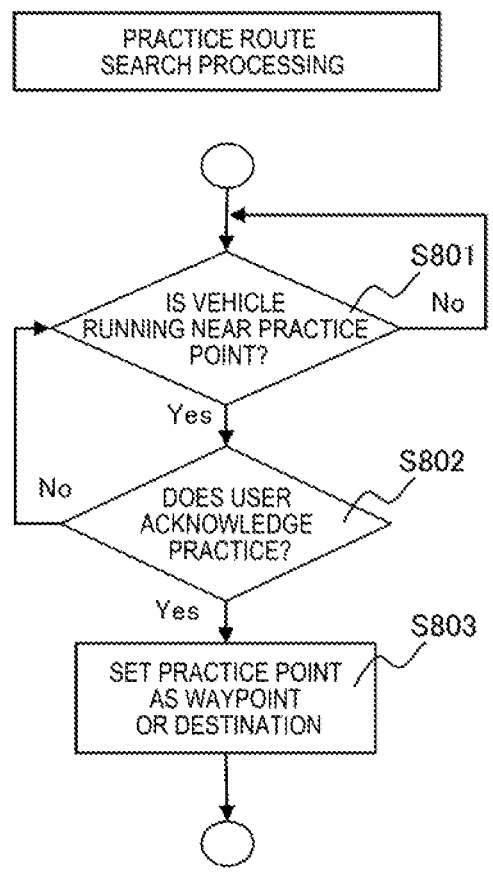
FIG. 16 is a diagram illustrating a flowchart of practice route search processing.

In step S503, the driving assistance unit 219 of the in-vehicle terminal 200 executes practice route search processing based on the practice point list 216 extracted in step S502. In the practice route search processing, the driving assistance unit 219 searches for a practice route passing through the practice point indicated in the practice point list 216, and assists the driver to experience the driving necessary for traveling by driving along the practice route. The details of step S503 are illustrated in FIG. 16.

FIG. 14 is a diagram illustrating a flowchart of the practice technique requirement calculation processing to be executed in step S501 of FIG. 13.

In step S601, the practice technique requirement calculating unit 121 determines whether there is an driving skill element not to be compared with the driving skill-level of the driver out of the driving skill elements of the driving skill-level requirement 117 calculated by the route evaluation unit 114. As a result, if there is the driving skill element not to be compared, one of the driving skill elements is selected and the process proceeds to step S602, and if all the driving skill elements have already been compared, the processing flow of FIG. 14 is completed.

In step S602, the practice technique requirement calculating unit 121 compares, with respect to the driving skill element selected in step S601, the requirement of the driving skill-level defined by the driving skill-level requirement 117, that is, the difficulty level with the driving skill-level of the driver stored in the driving skill-level DB 119. As a result, when the driving skill-level of the driver is lower than the difficulty level of the driving skill-level requirement 117, it is determined that the driving skill-level of the driver does not satisfy the requirement in the driving skill element, the process proceeds to step S603. On the other hand, when the driving skill-level of the driver is equal to or higher than the difficulty level of the driving skill-level requirement 117, it is determined that the driving skill-level of the driver meets the requirement in the driving skill element, the process returns to step S601.

In step S603, the practice technique requirement calculating unit 121 adds the driving skill element selected in step S601 and the requirement of the driving skill-level prescribed in the driving skill-level requirement 117 with respect to the driving skill element, that is, the difficulty level to the practice technique requirement list. Upon completion of step S603, the process returns to step S601.

FIG. 15 is a diagram illustrating a flowchart of the practice point extraction processing to be executed in step S502 of FIG. 13.

In step S701, the practice point extraction unit 213 uses the map DB 212 to start searching for a road in a current running direction of the host vehicle, and selects the road in the running direction as a subsequent processing target.

In step S702, the practice point extraction unit 213 confirms the running history of the driver with respect to the road in the running direction selected as the processing target in step S701 from the running history recorded in the running history DB 211, and determines whether there is a road having the number of times of passage equal to or less than a certain number. As a result, if there is a road having the number of times of passage equal to or less than a certain number, the road is extracted and the process proceeds to step S703. If the number of times of passage of all the roads in the running direction exceeds a certain number, the process returns to step S701 and continues to search for the road.

In step S703, the practice point extraction unit 213 determines, based on the practice technique requirement list included in the driving assistance information distributed from the server 100, whether the road extracted in step S701 satisfies the practice technique requirement. Here, it is confirmed using the driving skill element definition list 214 whether there is a place corresponding to the combination of the driving skill element and the difficulty level indicated in the practice technique requirement list on the road extracted in step S701. As a result, if there is a corresponding place on the extracted road, the place is extracted as a practice point and the process proceeds to step S704. If not, the process returns to step S701.

In step S704, the practice point extraction unit 213 adds the place extracted in step S703 to the practice point list 216. After executing step S704, the practice point extraction unit 213 ends the processing flow of FIG. 15.

FIG. 16 is a diagram illustrating a flowchart of the practice route search processing to be executed in step S503 of FIG. 13.

In step S801, the driving assistance unit 219 uses the map DB 212 to determine whether the host vehicle passes through any of the practice points indicated in the practice point list 216. When the host vehicle is running in the vicinity of any of the practice points, the practice point is extracted as a subsequent processing target, and the process proceeds to the next step S802.

In step S802, the driving assistance unit 219 inquires the driver about whether to practice the practice point extracted in step S801, and acquires a response from the driver. Here, for example, on the display device 201 of the in-vehicle terminal 200, a screen such as "There are practice points around here. Would you like to practice at the point?" is displayed, and a response operation input using the operation device 202 by the driver may be detected from the screen display. In addition, inquires to the driver and responses from the driver may be performed by a conversation voice response using a speaker or microphone (not illustrated). As a result, when the driver acknowledges the practice, the process proceeds to the next step S803, and when not acknowledge, the process returns to step S801 and waits until the vehicle run near the next practice point.

In step S803, the driving assistance unit 219 sets the practice point extracted in step S801 as a waypoint or a destination, and guides the practice point so that the host vehicle can run. Here, if the destination is being set, the practice point is set as the waypoint, and if the destination is not set, the practice point may be set as the destination. After executing step S803, the driving assistance unit 219 ends the processing flow of FIG. 16.

Figure 17:
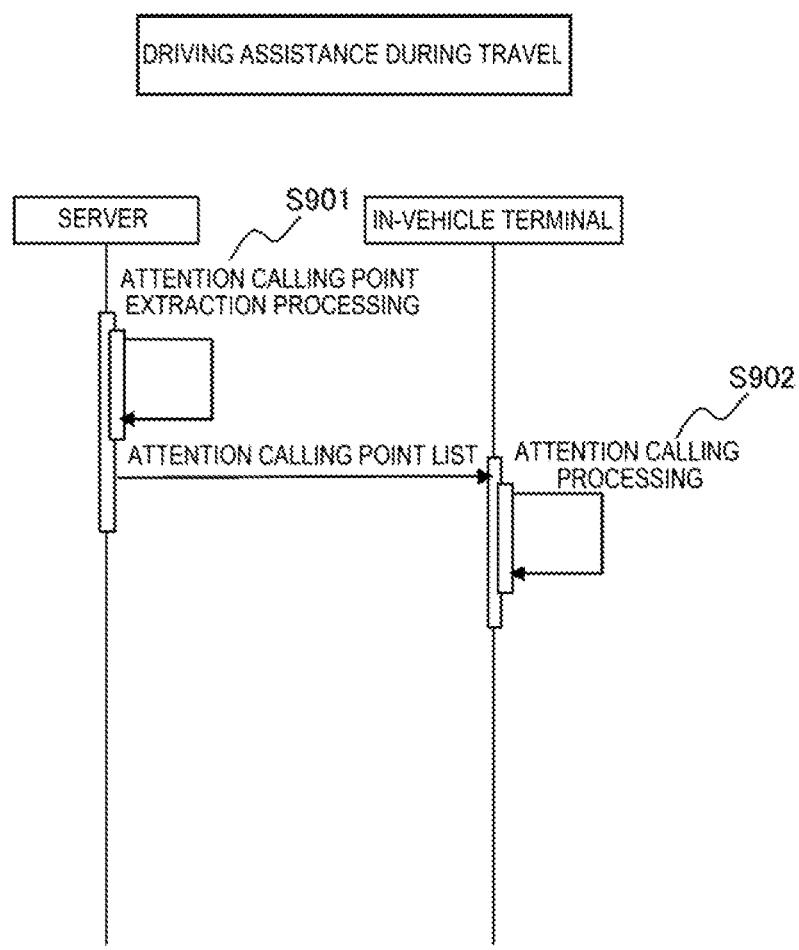
FIG. 17 is a sequence diagram of driving assistance during traveling.

FIG. 17 is a sequence diagram of the driving assistance during traveling performed by the information system in order to call an attention to the driver who runs at a place requiring driving skill elements whose driver's experience is insufficient on the day when the driver makes a travel to the registered designation. The server 100 executes the driving assistance during traveling illustrated in the sequence diagram of FIG. 17 when the driver, who registers a destination whose date set on the travel date 302 in the destination list 111 is on or after the next day, gets in the host vehicle and uses the information system.

Figure 18:
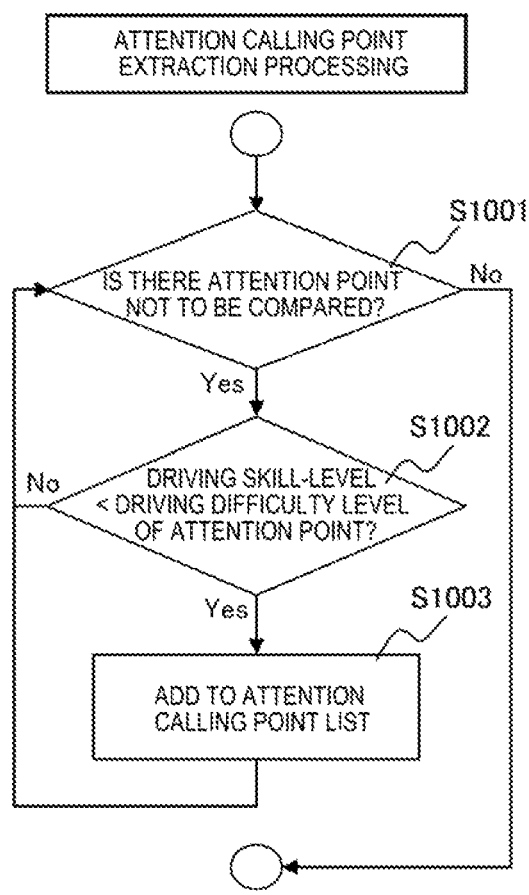
FIG. 18 is a diagram illustrating a flowchart of attention calling point extraction processing.

In step S901, the attention calling point extraction unit 122 of the server 100 executes attention calling point extraction processing based on the attention point list 118 and the driving skill-level of the driver stored in the driving skill-level DB 119. In the attention calling point extraction processing, the attention calling point extraction unit 122 extracts, as an attention calling point, an attention point requiring the driving skill element whose driver's experience is insufficient, from the attention points indicated in the attention point list 118. The details of step S901 are illustrated in FIG. 18. The information on the attention calling point calculated in step S901 is distributed to the in-vehicle terminal 200 by the distribution information control unit 123, as the attention calling point list 218 included in the driving assistance information.

In step S902, the driving assistance unit 219 of the in-vehicle terminal 200 acquires the attention calling point list 218 from the driving assistance information distributed from the server 100, and executes attention-calling processing using the list. In the attention-calling processing, the driving assistance unit 219 calls attention to the driver when the host vehicle passes through the attention calling point indicated in the attention calling point list 218, thereby assisting to so that the driver can comfortably drive at the attention calling point. The details of step S902 are illustrated in FIG. 19.

FIG. 18 is a diagram illustrating a flowchart of the attention calling point extraction processing to be executed in step S901 of FIG. 17.

In step S1001, the attention calling point extraction unit 122 determines whether there is an attention point not to be compared with the driving skill-level of the driver out of the attention points indicated in the attention point list 118 calculated by the route evaluation unit 114. As a result, if there is the attention point not to be compared, one of the attention points is selected and the process proceeds to step S1002, and if all the attention points have already been compared, the processing flow of FIG. 18 is completed.

In step S1002, the attention calling point extraction unit 122 compares, with respect to the attention point selected in step S1001, the difficulty level for the driving skill classification defined in the attention point list 118 with the driving skill-level in the driving skill classification of the driver stored in the driving skill-level DB 119. As a result, when the driving skill-level of the driver is lower than the difficulty level of the attention point list 118, it is determined that the attention to the driver at the attention point is required, and the process proceeds to step S1003. On the other hand, when the driving skill-level of the driver is equal to or higher than the difficulty level of the attention point list 118, it is determined that the attention to the driver at the attention point is not required, and the process returns to step S1001.

In step S1003, the attention calling point extraction unit 122 adds the attention point selected in step S1001 to the attention calling point list, as an attention calling point. After executing step S1003, the process returns to step S1001.

FIG. 19 is a diagram illustrating a flowchart of attention calling processing to be executed in step S902 of FIG. 17.

In step S1101, the driving assistance unit 219 acquires the destination list 111 related to the driver from the server 100, and sets the destination indicated by the destination list 111 to search for the route. Then, the inducing guidance is started according to the searched route.

In step S1102, the driving assistance unit 219 determines whether the host vehicle has arrived at the destination. If the host vehicle has arrived at the destination, the processing flow of FIG. 19 is ended, and if not arrived, the process proceeds to step S1103.

In step S1103, the driving assistance unit 219 uses the map DB 212 to determine whether the host vehicle passes through a point before any of the attention calling points indicated in the attention calling point list 218. When the host vehicle is running at a point before any of the attention calling points, the attention calling point is extracted as a subsequent processing target, and the process proceeds to the next step S1104.

In step S1104, the driving assistance unit 219 calls attention to the driver with respect to the attention calling point extracted in step S1103. For example, as an attention calling method to the driver, a prescribed guidance screen may be displayed on the display device 201 of the in-vehicle terminal 200, or guidance may be performed by voice. The attention calling content may be changed according to the level of the driving skill classification and driving skill-level corresponding to the attention calling point. Upon completion of step S1104, the process returns to step S1002.

Figure 20A:
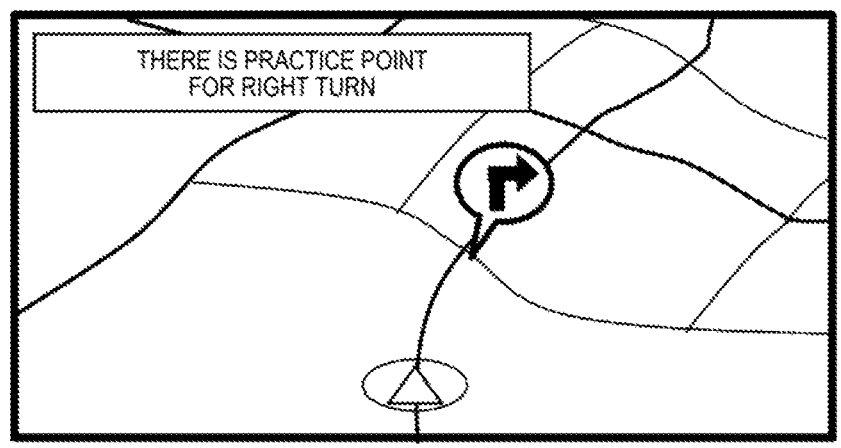
FIGS. 20A and 20B are diagrams illustrating screen examples when a practice point is proposed to a driver.
Figure 20B:
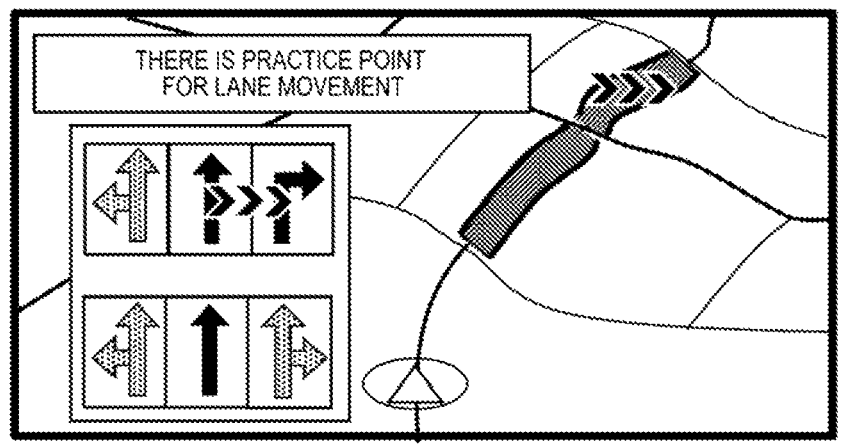

FIGS. 20A and 20B are diagrams illustrating examples of a screen displayed on the display device 201 when proposing a practice point to the driver in step S802 of FIG. 16.

FIG. 20A illustrates an example of a screen when a right-turn practice point is proposed. When proposing one point on the road as a practice point such as a right turn at an intersection, for example, as illustrated in FIG. 20A, a screen showing the point on the map is displayed on the display device 201.

FIG. 20B illustrates an example of a screen when a practice point for lane movement is proposed. When a certain range such as lane movement while running on the road rather than one point on the road is proposed as a practice point, for example, as illustrated in FIG. 20B, a screen showing the range on a map is displayed on the display device 201. In the screen example of FIG. 20B, running lanes before and after the movement are displayed in an emphasized manner and a position of lane movement is indicated on the map as a timing of lane movement.

According to the embodiment of the invention described above, when the driver unfamiliar with the driving goes far away by the travel, it is possible to practice the driving at difficult road shapes or traffic conditions using a place familiar to the driver as a practice point, for example, near the home. Thus, it is possible to reduce anxiety about the driving at the time of traveling. In addition, since the place familiar to the driver is used as the practice point, the driver can practice the necessary driving at the time of traveling, following daily driving such as shopping. Therefore, it is expected to reduce practice anxiety and improve practice opportunities. Further, since the driving skill-level is taken into consideration for each driver, it is possible to perform driving assistance using appropriate locations for each driver as practice points and attention calling points.

According to the embodiment of the invention described above, operational effects are obtained as follows.

(1) The information system includes the in-vehicle terminal 200 mounted on the host vehicle and the server 100 that communicates with the in-vehicle terminal 200. The server 100 includes the running history DB 116 in which the running history of the host vehicle is stored for each driver, the driving skill-level determination unit 115, the driving skill-level DB 119 in which the driving skill-level determined by the driving skill-level determination unit 115 is stored, and the distribution information control unit 123 that distributes the driving assistance information based on the driving skill-level stored in the driving skill-level DB 119 to the in-vehicle terminal 200. The driving skill-level determination unit 115 determines the driving skill-level of the driver for each of the driving skill element, based on the running history stored in the running history DB 116 and the driving skill element definition list 113 representing the difficulty level of the driving predefined for each of the driving skill elements. In this way, it is possible to provide the driving assistance information in consideration of the driving skill-level for the driver who is not familiar to the driving.

(2) The server 100 further includes the practice technique requirement calculating unit 121 that calculates the practice technique requirement to be practiced in advance by the driver, based on the driving skill-level. The distribution information control unit 123 distributes the driving assistance information including information on the practice technique requirement, which is calculated by the practice technique requirement calculating unit 121, to the in-vehicle terminal 200 (FIG. 13, step S501). When receiving the driving assistance information, the in-vehicle terminal 200 searches for the practice route including the practice point for causing the driver to practice the practice technique requirement in advance, based on the received driving assistance information (FIG. 13, step S503), and guides the vehicle according to the searched practice route. In this way, before the driver makes a travel to the destination, the driver can experience the driving necessary for the travel.

(3) The server 100 further includes an attention calling point extraction unit 122 that extracts an attention calling point, based on the driving skill-level, when the vehicle runs along a route to a destination, the attention calling point being a point at which an attention-calling is issued to the driver. The distribution information control unit 123 distributes the driving assistance information including information on the attention calling point, which is extracted by the attention calling point extraction unit 122, to the in-vehicle terminal 200 (FIG. 17, step S901). When receiving the driving assistance information, the in-vehicle terminal 200 assists driving of the driver at the attention calling point, based on the received driving assistance information (FIG. 17, step S902). In this way, it is possible to call an attention to the driver who runs a place at which the driving skill element is required due to the insufficient experience, on the day of driver's traveling to the destination.

(4) The distribution information control unit 123 performs one of the pre-travel driving assistance illustrated in FIG. 13 or the driving assistance during the traveling illustrated in FIG. 17 according to a date, on which the vehicle is scheduled to go to a destination, and a current date, and thus changes contents of the driving assistance information to be distributed to the in-vehicle terminal 200. In this way, it is possible to distribute the driving assistance information appropriate for the driver to the in-vehicle terminal 200 from the server 100 either before traveling or on the day of traveling.

In the embodiment described above, the information system can implement both the pre-travel driving assistance illustrated in FIG. 13 and the driving assistance during traveling illustrated in FIG. 17, and one of these driving assistances is selectively executed by comparing the date set in the travel date 302 in the destination list 111 with the current date, but only one of the driving assistances may be performed by the information system. In this case, the server 100 may include only one of the practice technique requirement calculating unit 121 and the attention calling point extraction unit 122 which corresponds to the driving assistance to be performed. In the in-vehicle terminal 200, only one driving assistance may be performed by the driving assistance unit 219 based on the distribution information from the server 100, and the practice point extraction unit 213 and the driving skill element definition list 214 are unnecessary in the case of performing only the driving assistance during traveling.

The embodiments and various modifications described above are exemplary, and the present invention is not limited to those contents as far as the features of the invention are not impaired. While various embodiments and modifications are described above, the present invention is not limited to these contents. Other embodiments are contemplated within the scope of the technical idea of the present invention are also included within the scope of the present invention.

What is claimed is:

1. An information system comprising:
an in-vehicle terminal that is mounted on a vehicle; and
a server that communicates with the in-vehicle terminal,
the server including
a running history database in which a running history of the vehicle is stored for each driver,
a processor programmed to determine a driving skill-level of the driver for each of a plurality of driving skill elements, based on the running history stored in the running history database and a driving difficulty level predefined for each driving skill element, wherein the driving difficulty level includes information indicating contents of road conditions and traffic conditions,
a driving skill-level database that stores the driving skill-level determined for each of the driving skill elements by the processor, and
the processor is programmed to distribute driving assistance information based on the driving skill-level stored in the driving skill-level database to the in-vehicle terminal, wherein
the processor is further programmed to calculate a practice technique requirement to be practiced by the driver, based on the driving skill-level,
the processor distributes the driving assistance information including information on the practice technique requirement to the in-vehicle terminal, and
when receiving the driving assistance information, the in-vehicle terminal searches for a practice route, including a practice point, for causing the driver to practice the practice technique requirement, based on the received driving assistance information and guides the vehicle according to the searched practice route.

2. The information system according to claim 1, wherein
the processor is further programmed to extract, based on the driving skill-level, an attention calling point when the vehicle runs along a route to a destination, the attention calling point being a point at which an attention-calling is issued to the driver,
the processor distributes the driving assistance information including information on the attention calling point to the in-vehicle terminal, and
when receiving the driving assistance information, the in-vehicle terminal assists driving of the driver at the attention calling point, based on the received driving assistance information.

3. The information system according to claim 1, wherein
the processor changes contents of the driving assistance information to be distributed to the in-vehicle terminal according to a date on which the vehicle is scheduled to go to a destination, and a current date.

4. A driving assistance information providing method of providing driving assistance information from a server to an in-vehicle terminal, the method comprising:
storing a running history of a vehicle mounted with the in-vehicle terminal for each driver in the server;
determining a driving skill-level of the driver for each of driving skill elements in the server, based on the running history and a driving difficulty level predefined for each of a plurality of driving skill elements, wherein the driving difficulty level includes information indicating contents of road conditions and traffic conditions; and
distributing driving assistance information based on the driving skill-level from the server to the in-vehicle terminal, wherein
the server calculates a practice technique requirement to be practiced by the driver, based on the driving skill-level,
the driving assistance information including information on the practice technique requirement is distributed to the in-vehicle terminal from the server, and
when the in-vehicle terminal receives the driving assistance information, the in-vehicle terminal searches for a practice route, including a practice point, for causing the driver to practice the practice technique requirement, based on the received driving assistance information and guides the vehicle according to the searched practice route.

5. The driving assistance information providing method according to claim 4, wherein
the server extracts an attention calling point, based on the driving skill-level, when the vehicle runs along a route to a destination, the attention calling point being a point at which an attention-calling is issued to the driver,
the driving assistance information including information on the attention calling point is distributed to the in-vehicle terminal from the server, and
when the in-vehicle terminal receives the driving assistance information, the in-vehicle terminal assists driving of the driver at the attention calling point, based on the received driving assistance information.

6. The driving assistance information providing method according to claim 4, wherein
contents of the driving assistance information are changed, the driving assistance information being distributed to the in-vehicle terminal from the server, according to a date on which the vehicle is scheduled to go to a destination, and a current date.

7. An in-vehicle terminal that is mounted on a vehicle, comprising:
a running history database that acquires a running history of the vehicle associated with a driver of the vehicle;
a transmitter configured to transmit the running history to a server and receive driving assistance information distributed from the server; and
a processor programmed to perform driving assistance of the driver according to a driving skill-level of the driver for each of driving skill elements, based on the driving assistance information received by the transmitter;
wherein the driving skill-level of the driver is determined based on the running history and a driving difficulty level predefined for each of the driving skill elements, the driving difficulty level including information indicating contents of road conditions and traffic conditions;
wherein the transmitter receives, from the server, the driving assistance information including information on a practice technique requirement to be practiced by the driver, the practice technique requirement being calculated based on the driving skill-level; and
wherein the processor searches for a practice route, including a practice point, for causing the driver to practice the practice technique requirement, based on the driving assistance information and guides the vehicle according to the searched practice route, thereby assisting driving of the driver.

8. The in-vehicle terminal according to claim 7, wherein
the transmitter receives the driving assistance information including information on an attention calling point extracted based on the driving skill-level, the attention calling point being a point at which an attention-calling is issued to the driver, and
the processor calls an attention to the driver when the vehicle approaches the attention calling point, thereby assisting the driving of the driver based on the driving assistance information.

9. The in-vehicle terminal according to claim 7, wherein
the processor changes contents of the driving assistance according to a date on which the vehicle is scheduled to go to a destination, and a current date.

* * * * *